US005704492A

United States Patent [19]

Bartko

[11] Patent Number: 5,704,492
[45] Date of Patent: Jan. 6, 1998

[54] WICKING DEVICE FOR A DRAIN RACK AND DISH DRAIN TRAY

[76] Inventor: Bruce A. Bartko, 816 E. 11th Ave., Munhall, Pa. 15120

[21] Appl. No.: 541,877

[22] Filed: Oct. 10, 1995

[51] Int. Cl.⁶ ........................................ A47F 7/00
[52] U.S. Cl. ............................................. 211/41
[58] Field of Search ............................. 211/41, 126

[56] References Cited

U.S. PATENT DOCUMENTS

| 1,789,232 | 1/1931 | Hertz | 211/41 |
| 2,479,118 | 8/1949 | Jenness | 211/41 |
| 3,952,875 | 4/1976 | Lombardo | 211/41 |
| 4,531,641 | 7/1985 | Archambault | 211/41 |
| 4,854,537 | 8/1989 | Welch | 248/346 |
| 5,158,184 | 10/1992 | Craft et al. | 211/41 |

*Primary Examiner*—Alvin C. Chin-Shue
*Assistant Examiner*—Sarah L. Purol
*Attorney, Agent, or Firm*—Webb Ziesenheim Bruening Logsdon Orkin & Hanson, P.C.

[57] ABSTRACT

A wicking mat for use with a drain tray and a dish rack. The wicking mat includes a plurality of strips which are adapted to wick liquid from the dish drain tray towards a sink. The wicking mat preferably is made of a cotton material.

12 Claims, 5 Drawing Sheets

5,704,492

WICKING DEVICE FOR A DRAIN RACK AND DISH DRAIN TRAY

BACKGROUND OF THE INVENTION

1) Field of the Invention

This invention relates to dish drainers made up of a dish rack and a drain tray, in general, and more particularly, to an apparatus for use in the drain tray to remove liquid accumulated in the dish drain.

2) Description of the Prior Art

Dish drain trays and dish racks are known in the art, see for example, U.S. Pat. Nos. 3,952,875; 4,531,641; and 4,854,537. Typically, wet dishes are placed in a dish rack for air drying after the dishes have been washed with water. A receptacle or drain tray, as it is known in the art, is positioned below the dish rack. The water drips from the plates and accumulates on the drain tray. Generally, the water accumulates in pools for substantial periods of time before it eventually evaporates. This accumulated water can cause several problems, namely, bacteria growth and/or mold growth.

It is an object of my invention to eliminate the accumulation of water in drain trays that remain on the drain tray for a substantial period of time.

SUMMARY OF THE INVENTION

My invention is a mat that is adapted to be received in a dish drain tray or similar receptacle that includes a plurality of wicking sections in fluid communication with each other. The wicking sections are made of a wicking material adapted to wick a liquid, such as a fibrous material like cotton. Preferably, at least one of the wicking sections directs the water away from the dish drain toward a sink. Preferably, the mat includes a plurality of longitudinal sections crisscrossing each other. The wicking mat can be disposable and used in combination with a dish rack and drain tray.

Also, my invention is a method for removing a liquid from a receptacle that includes the steps of:

(a) resting a wicking mat on the receptacle;

(b) placing a liquid in the receptacle;

(c) wicking the liquid into the wicking mat;

(d) moving the wicked liquid through the wicking mat toward an exit end of the wicking mat; and (e) directing the wicked liquid away from the exit end and away from the receptacle.

DESCRIPTION OF THE PREFERRED EMBODIMENTS

Figure 1:
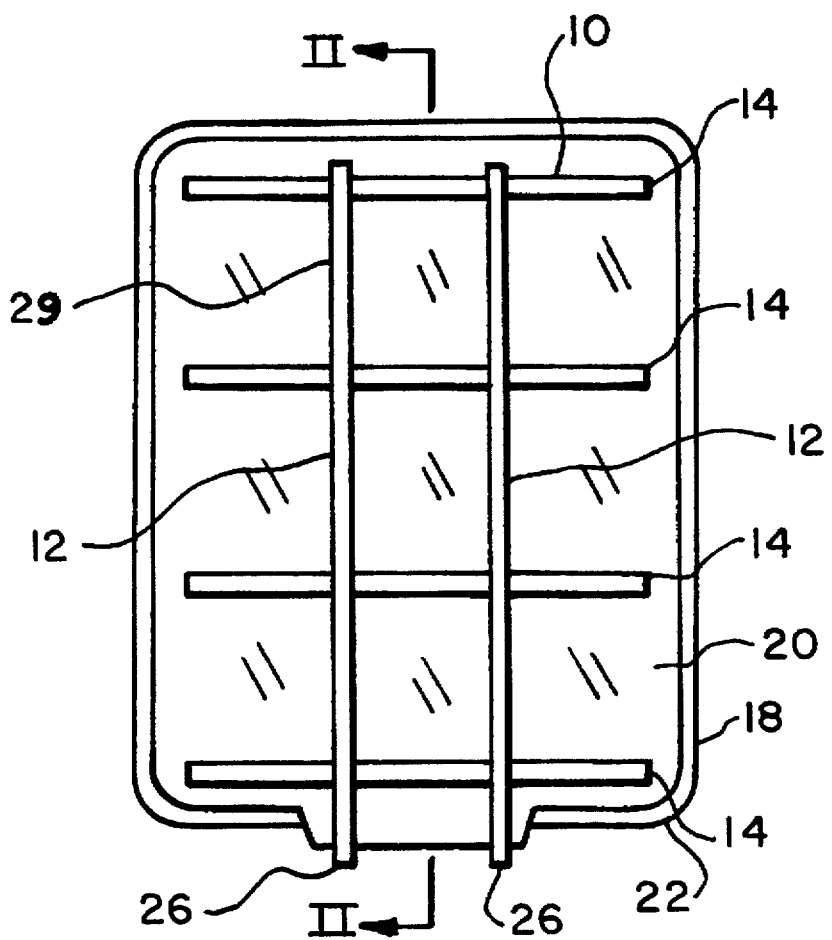
FIG. 1 is a top view of a wicking mat, made in accordance with the present invention, resting on a drain tray.
Figure 2:
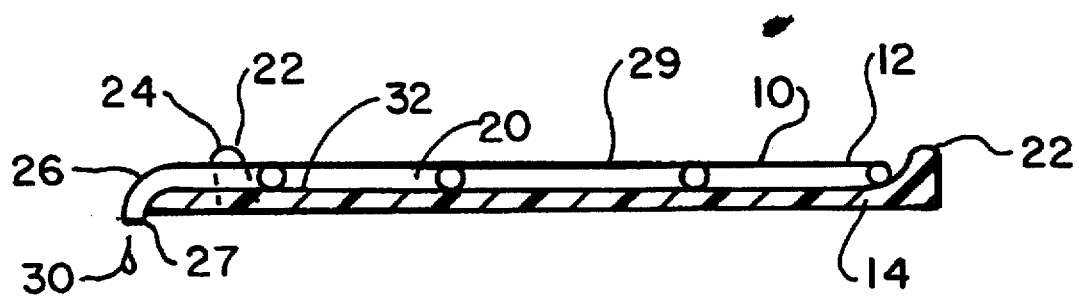
FIG. 2 is a sectional view taken along lines II—II.
Figure 3:
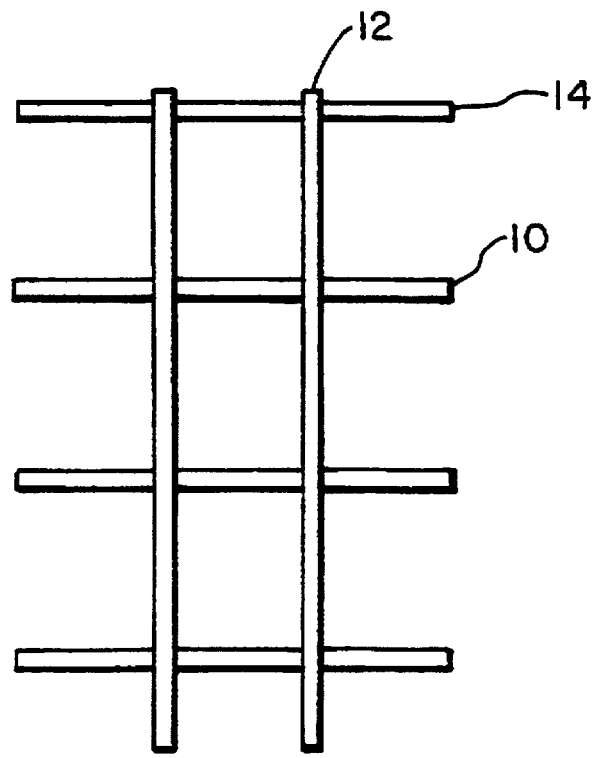
FIG. 3 is a top view of the wicking mat shown in FIG. 1.

Referring to FIGS. 1-3, a wicking mat 10 is shown, made in accordance with the present invention. The wicking mat 10 is made of a plurality of longitudinally extending strips 12 and are crisscrossed by a plurality of horizontally extending strips 14. The horizontal strips 14 are attached to the longitudinal strips 12, preferably by being sewn together. However, the horizontal strips 14 and vertical strips 12 can be laid on top of each other so that they are in fluid communication with each other. Alternatively, the wicking mat 10 can be cut from a single piece of material so as to define longitudinally extending sections and horizontally extending sections.

The strips 12 and 14 are made of a wicking material, i.e., a material adapted to wick or absorb a liquid. Generally, the wicking material is a fibrous material. Preferably, if the strips 12 and 14 are to be used for absorbing water or wicking water, they should be made of a cotton material, such as Sorbent Rug Blue or Sorbent Rug Black, which is sold by Conwed, Inc. of Delanco, N.J. 08075.

The wicking mat 10 rests on an upper surface of a drain tray or receptacle 18. Typically, the drain tray 18 is made of rubber or a polymeric material. Preferably, the drain tray 18 should be cleaned prior to placing or resting the mat 10 thereon. The drain tray 18 includes a flat section 20 adapted to accumulate water and a plurality of side walls 22. As shown in FIG. 1, a passageway 24 is defined in a wall 22 through which an extending portion 26 of the longitudinal strips 12 passes through. The extending portions 26 have ends 27 that are positioned below the main portion or body portion 29 of the wicking mat 10. The body portion 29 rests on the drain tray flat section 20. The body portion 29 includes all of the horizontal strips 14 and portions of the longitudinal strips 12. Preferably, the ends 27 of the extending portions 26 extend below the drain tray 18.

Figure 4:
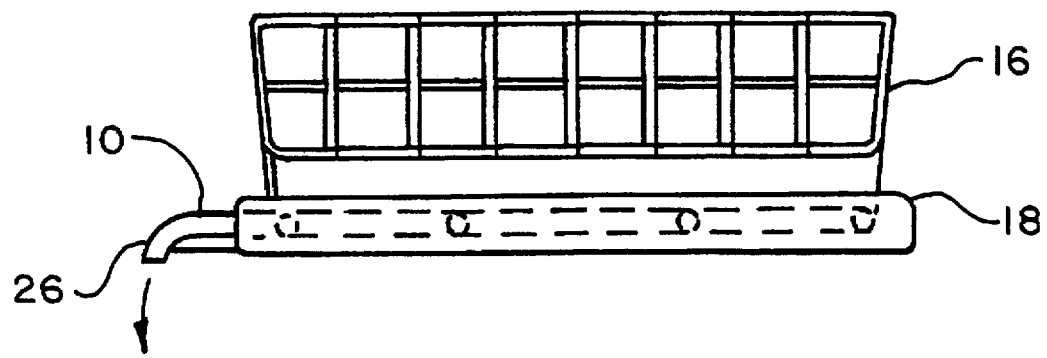
FIG. 4 is a side view of the wicking mat and the drain tray shown in FIG. 1 with a dish rack resting on the drain tray.

As shown in FIG. 4, a dish rack 16 is adapted to rest on the drain tray 18 in a manner well known in the art. Alternatively, the dish rack 16 can rest on the mat strips 12 and 14. In either case, the dish rack 16 is positioned above the mat 10 so that wet dishes, glasses, etc. placed in the dish rack 16 to dry are positioned above the mat 10.

Figure 5:
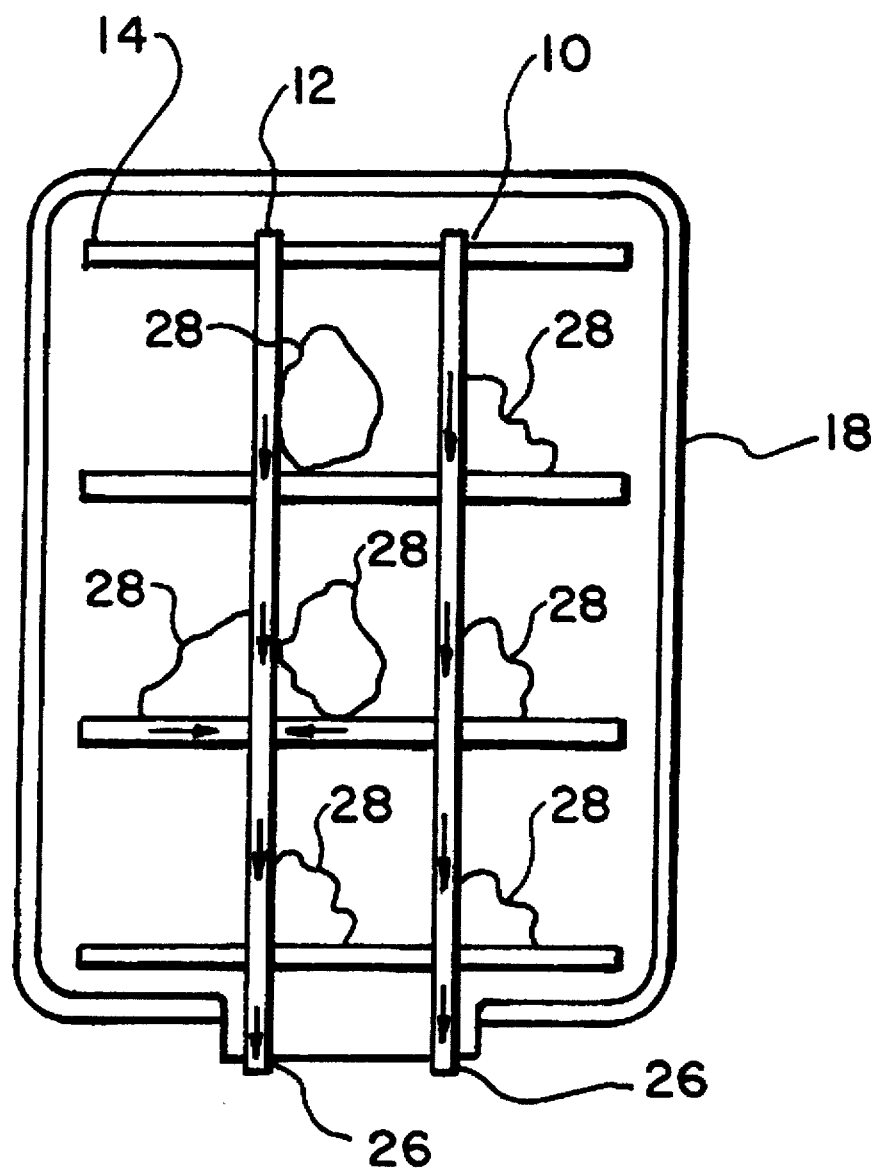
FIG. 5 is a top view of the wicking mat and the drain tray with pools of water resting on the drain tray.

In operation, wet dishes and plates are received by the dish rack 16 and any accumulated water on them drips into the drain tray 18. As shown in FIG. 5, water pools 28 accumulate in the drain tray 18. The water pools 28 are then wicked into the strips 12 and 14 and the wicked water moves toward the extending portions 26. Arrows drawn on FIG. 5 illustrate the movement of the wicked water. The wicked water then exits ends 27 in the form of water drops 30. The exiting water is directed into a sink or other receptacle away from the drain tray 18 and mat 10. The mat 10 quickly and inexpensively removes the pools of water that would otherwise accumulate and lay in the drain tray 18. I have found that the ends 27 should be positioned below the upper surface 32 of the flat tray section 20 for the water to quickly drip from ends 27.

After a period of time, the mat 10 will become dirty from food particles. This affects the performance of the mat 10. Therefore, the mat 10 should be disposed of and replaced with a new clean mat. Preferably, the mat 10 is sold as a separate item from the dish rack 16 and drain tray 18; alternatively, they may be sold as a set. The longitudinal strips 12 and horizontal strips 14 may have to be cut to fit in the appropriate sized drain tray 18. The longitudinal strips may also have to be cut so that the ends 27 are positioned in a sink.

The wicking mat 10 can also be used to wick liquids other than water. In that case, an appropriate wicking material should be chosen to effectively wick the liquid, such as for example, a mat 10 made up of polypropylene to wick an oil-based product.

Figure 6:
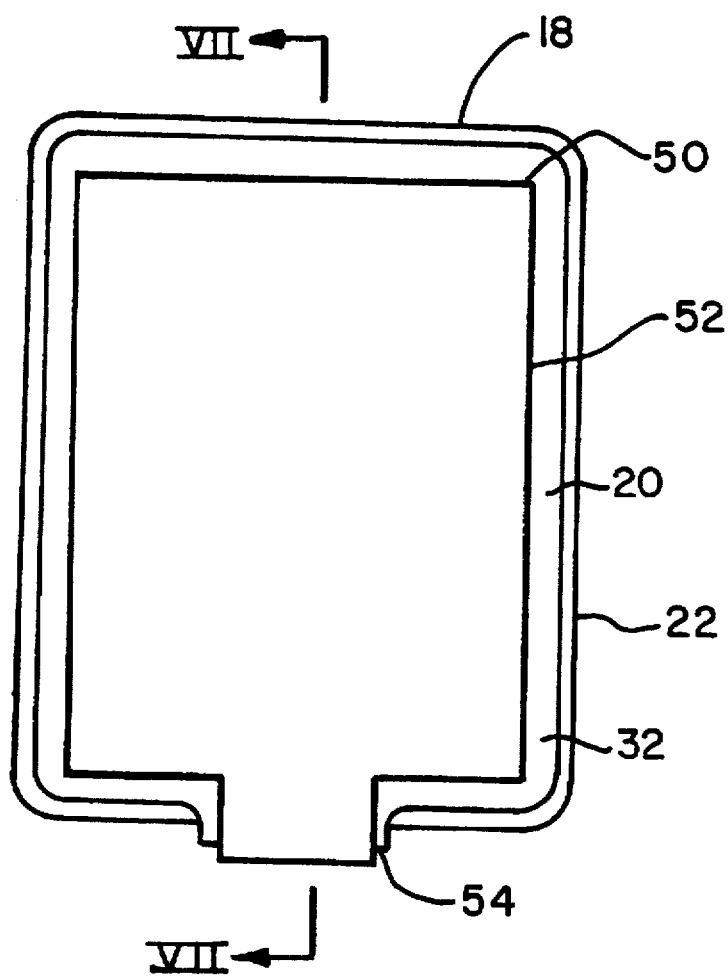
FIG. 6 is a top view of a second embodiment of a wicking mat, made in accordance with the present invention, resting on drain tray.
Figure 7:
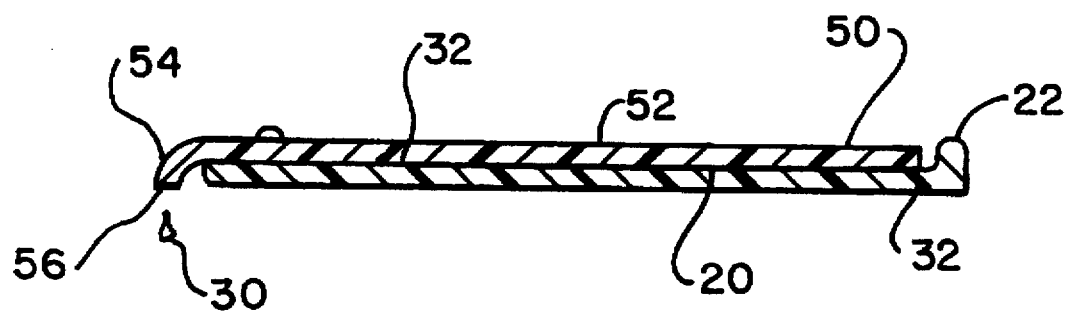
FIG. 7 is a sectional view along lines VII—VII.

FIGS. 6 and 7 show another wicking mat 50, made in accordance with the present invention. Mat 50 includes a body section 52 and an extending section 54. Mat 50 is similar to mat 10, except mat 50 is in the form of a continuous sheet as opposed to in the form of a plurality of crisscrossed strips. Mat 50 is preferably made from a single piece of wicking material as previously described. The body section 52 is preferably wider than the extending section 54. The body section 52 rests on the drain tray flat section 20 and the extending section 54 extends from the drain tray flat section 20 so that the extending section end 56 extends below the upper surface 32 of the drain tray 18. Preferably, end 56 extends below the drain tray 18. Water dripping onto the body section 52 will be wicked toward the extending section 54 and exits end 56 in the form of drops 30.

Figure 8:
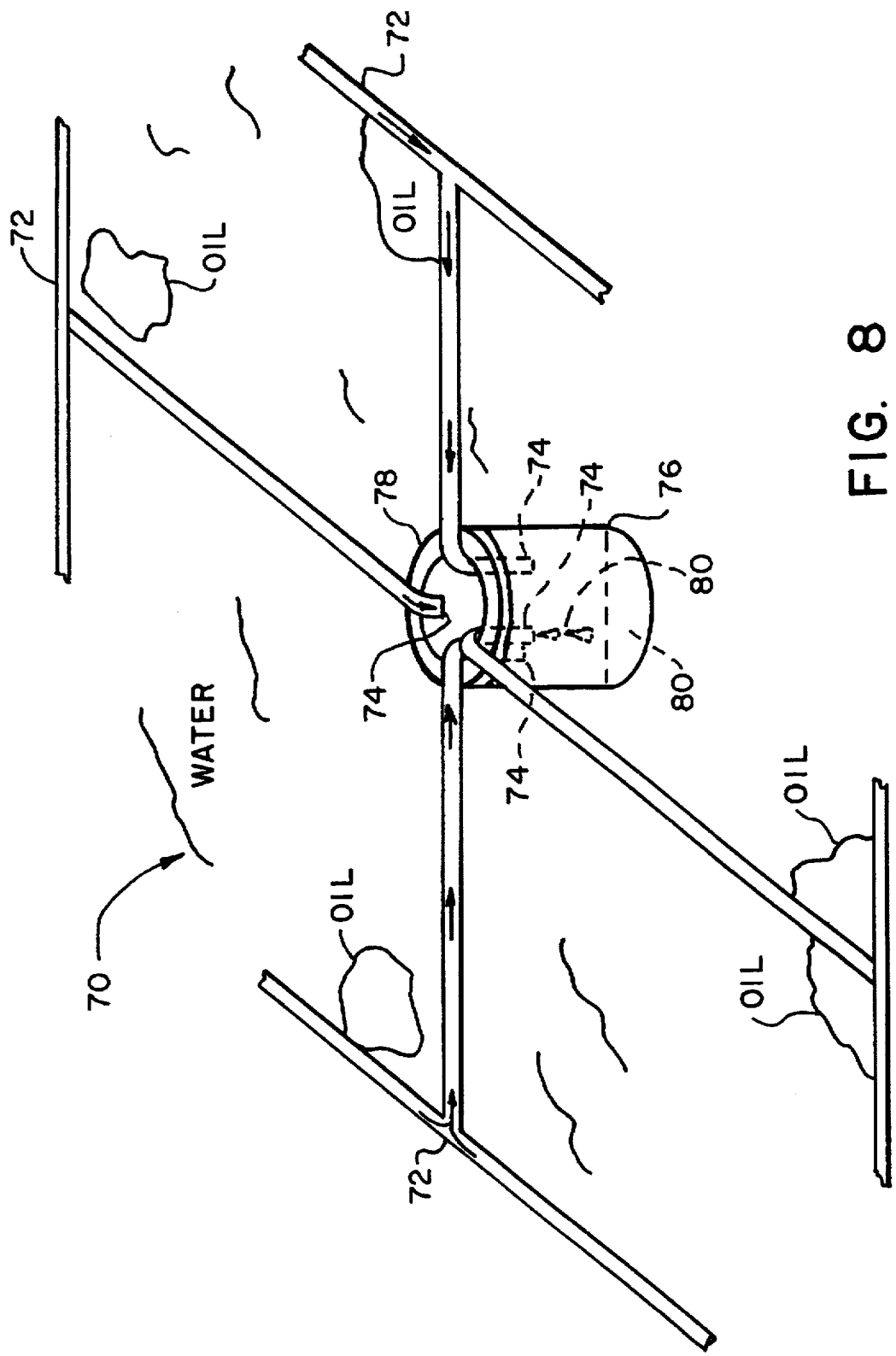
FIG. 8 is a top perspective view of another embodiment of my invention.

FIG. 8 shows a wicking device 70 used to clean up oil spills on water. FIG. 8 shows a plurality of "T" shaped wicking strips 72 made of polypropylene. I have found that wicking strips of fibrous polypropylene will wick oil, but is not as effective in wicking water. The strips include a frame member to permit the strips to maintain their "T" shape. Ends 74 of the strips are received in an open topped receptacle 76. A float ring 78 is provided around an upper edge of the receptacle 76.

The wicking device 70 operates as follows. After an oil spill occurs on water, the wicking device 70 is placed on the spill area. The oil is wicked by strips 72 towards receptacle 76. The float ring 78 is of sufficient buoyancy so that the upper edge of the float ring 78 is positioned above the liquid. The ends 74 are positioned within the receptacle 76 below the remainder of the strips 72 that are soaking up the oil.

The oil then is wicked from the water surface into the receptacle 76 and exits the ends 74 in the form of drops of oil. The accumulated oil 80 in the receptacle 76 can periodically be removed. After the oil is wicked, then the device 70 can be removed from the water.

Having described the presently preferred embodiments of my invention, it is to be understood that it may otherwise be embodied within the scope of the appended claims.

I claim:

1. A disposable mat for use with a dish drain tray, wherein the dish drain tray includes a supporting surface, said mat comprising:

a plurality of longitudinally extending wicking sections and a plurality of horizontally extending wicking sections, wherein said horizontally extending wicking sections are attached to said longitudinally extending wicking sections so that said longitudinally extending wicking sections and said horizontally extending wicking sections are in fluid communication with each other, said horizontally extending wicking sections and said longitudinally extending wicking sections made of a fibrous wicking material adapted to wick liquid, wherein said horizontally extending wicking sections are adapted to rest on the supporting surface and at least one end of each of said longitudinally extending wicking sections is adapted to be positioned below said dish drain tray so that wicked liquid contained in the dish drain tray will drip from said longitudinally extending wicking section ends and further comprising a dish rack adapted for receiving dishes positioned above said mat, said dish rack adapted to rest on said dish drain tray.

2. In combination, a dish drain tray, a dish rack and a mat, said dish drain tray comprising a supporting surface, and said mat resting on said supporting surface, said mat comprising:

a plurality of longitudinally extending wicking sections and a plurality of horizontally extending wicking sections, wherein said horizontally extending wicking sections are attached to the longitudinally extending wicking sections so that said longitudinally extending wicking sections and said horizontally extending wicking sections are in fluid communication with each other, said horizontally extending wicking sections and said longitudinally extending wicking sections are made of a fibrous material adapted to wick a liquid, said longitudinally extending sections and said horizontally extending sections defining a body portion and an extending portion, wherein said body portion includes all of said horizontally extending wicking sections and portions of said longitudinally extending sections, and said body portion rests on said dish drain tray and said extending portion extends below said dish drain tray so that liquid on said dish drain tray supporting surface can be wicked by said body portion toward said extending portion so that said liquid will drip from said extending portion, and said dish rack adapted for receiving dishes positioned above said mat, said dish rack adapted to rest on said dish drain tray.

3. A combination as set forth in claim 2, wherein said longitudinally extending wicking sections and said horizontally extending wicking sections are made of strips of wicking material.

4. A combination as set forth in claim 3, wherein said horizontally extending strips criss-cross said longitudinally extending strips.

5. A combination as set forth in claim 3, wherein said longitudinally extending sections and said horizontally extending sections are made of a fibrous wicking material.

6. A combination as set forth in claim 5, wherein said wicking material comprises cotton.

7. A method for removing a liquid from a drain tray having a supporting surface comprising the following steps:

a) resting a wicking mat on the drain tray supporting surface, wherein the mat includes a plurality of longitudinally extending wicking sections and a plurality of horizontally extending wicking sections, wherein the horizontally extending wicking sections are attached to the longitudinally extending wicking sections so that the longitudinally extending wicking sections and the horizontally extending wicking sections are in fluid communication with each other, the horizontally extending wicking sections and the longitudinally extending wicking sections are made of a fibrous material adapted to wick a liquid, the longitudinally extending sections and the horizontally extending sections defining a body portion and an extending portion, wherein the body portion includes all of the horizontally extending wicking sections and portions of the longitudinally extending sections, the body portion rests on the drain tray and the extending portion extends below the drain tray;

b) placing a liquid in the drain tray;

c) wicking the liquid into the body portion of the mat;

d) moving the wicked liquid through the body portion of the mat toward an exit end of the extending portion of the mat; and e) directing the wicked liquid away from the exit end and away from the drain tray;

f) providing a dish rack resting above the wicking mat for receiving dishes.

8. A method as set forth in claim 7, further comprising disposing the mat when it becomes dirty and replacing the disposed dirty mat with a clean mat.

9. The combination as set forth in claim 12, wherein said mat is T-shaped.

10. The combination as set forth in claim 12, wherein said mat is made of fibrous wicking material.

11. The combination as set forth in claim 10, wherein the fibrous wicking material comprises polypropylene.

12. In combination, a mat and a receptacle, said mat made of wicking material and including a body portion and an extending portion, an end of the extending portion positioned in said receptacle and positioned below said body portion, whereby liquid is wicked from said body portion and into said receptacle through said extending portion and further comprising a dish rack adapted for receiving dishes positioned above said mat, said dish rack adapted to rest on said receptacle.

* * * * *